US010992671B2

(12) United States Patent
Isola et al.

(10) Patent No.: US 10,992,671 B2
(45) Date of Patent: *Apr. 27, 2021

(54) DEVICE SPOOFING DETECTION USING MAC AUTHENTICATION BYPASS ENDPOINT DATABASE ACCESS CONTROL

(71) Applicant: BANK OF AMERICA CORPORATION, Charlotte, NC (US)

(72) Inventors: Rahul Isola, Charlotte, NC (US); Abhishek P. Manjunath, The Colony, TX (US); Richard Nannariello, Jacksonville, FL (US); Brian L. Larragueta, Rowlette, TX (US)

(73) Assignee: Bank of America Corporation, Charlotte, NC (US)

( * ) Notice: Subject to any disclaimer, the term of this patent is extended or adjusted under 35 U.S.C. 154(b) by 217 days.

This patent is subject to a terminal disclaimer.

(21) Appl. No.: 16/282,154

(22) Filed: Feb. 21, 2019

(65) Prior Publication Data

US 2020/0137055 A1  Apr. 30, 2020

Related U.S. Application Data

(60) Provisional application No. 62/753,556, filed on Oct. 31, 2018.

(51) Int. Cl.
*H04L 9/32* (2006.01)
*G06F 21/55* (2013.01)
(Continued)

(52) U.S. Cl.
CPC ...... *H04L 63/0876* (2013.01); *H04L 63/0236* (2013.01); *H04L 63/101* (2013.01); *H04L 63/1441* (2013.01); *H04L 63/20* (2013.01)

(58) Field of Classification Search
None
See application file for complete search history.

(56) References Cited

U.S. PATENT DOCUMENTS 7,814,531 B2  10/2010 Khosravi et al.
7,823,199 B1 * 10/2010 Rathi .................. H04L 63/1441
726/22

(Continued)

OTHER PUBLICATIONS

Evaluation of Network Port Scanning Tools. El-Nazeer. (Year: 2011).*

(Continued)

*Primary Examiner* — Venkat Perungavoor
(74) *Attorney, Agent, or Firm* — Michael A. Springs

(57) ABSTRACT

An information security system that includes a switch operably coupled to a device. The switch includes a plurality of ports configured to provide network connectivity for one or more endpoint devices to a network. The device is configured to receive device information for an endpoint device connected to a port of the switch, to identify a MAC address in the device information table that matches the MAC address for the endpoint device, and to identify a device type for the identified MAC address in the device information table. The device is further configured to determine that the device type for the endpoint device does not match the device type for the identified MAC address in the device information table and to set a port status for the port to blocked in response to determining that the device types do not match.

20 Claims, 6 Drawing Sheets

(51) Int. Cl.
*H04L 29/06* (2006.01)
*H04L 7/10* (2006.01)

(56) References Cited

U.S. PATENT DOCUMENTS

| | | | |
|---|---|---|---|
| 8,190,755 | B1 | 5/2012 | Satish et al. |
| 8,245,281 | B2 | 8/2012 | Cheeniyil et al. |
| 8,424,060 | B2 | 4/2013 | Xiao et al. |
| 8,479,267 | B2 | 7/2013 | Donley et al. |
| 8,752,132 | B2 | 6/2014 | Smith et al. |
| 8,806,633 | B2 | 8/2014 | Shaffer et al. |
| 9,420,464 | B2 | 8/2016 | Allyn |
| 9,438,630 | B2 | 9/2016 | Guevin et al. |
| 9,723,027 | B2 | 8/2017 | Vazquez Carames |
| 9,846,772 | B1 | 12/2017 | Satish |
| 9,860,208 | B1 | 1/2018 | Ettema et al. |
| 10,057,291 | B1 | 8/2018 | Glotzer et al. |
| 2009/0182854 | A1* | 7/2009 | Sun ................. H04L 49/351 709/223 |
| 2009/0304008 | A1* | 12/2009 | Kono ................ H04L 29/12839 370/395.53 |
| 2015/0095493 | A1* | 4/2015 | Xu ..................... H04B 3/542 709/225 |
| 2015/0281251 | A1* | 10/2015 | Lin ..................... H04L 63/10 726/1 |
| 2015/0295938 | A1 | 10/2015 | Guo et al. |
| 2017/0012662 | A1 | 1/2017 | Balaji et al. |
| 2018/0083859 | A1* | 3/2018 | Barnum ............. H04L 63/0236 |

OTHER PUBLICATIONS

Enhancing the performance and security against media-access-control table overflow vulnerability attacks. Tzang. SCN Wiley and Sons. (Year: 2014).*

Isola, R. et al., "MAC Authentication Bypass Endpoint Database Access Control," U.S. Appl. No. 16/282,118, filed Feb. 21, 2019, 48 pages.

* cited by examiner

DEVICE SPOOFING DETECTION USING MAC AUTHENTICATION BYPASS ENDPOINT DATABASE ACCESS CONTROL

CROSS-REFERENCE TO RELATED APPLICATIONS

The present application claims benefit of U.S. Provisional Patent Application No. 62/753,556 filed Oct. 31, 2018 by Rahul Isola, et al., and entitled "MAC Authentication Bypass (MAB) Endpoint Database Tool," which is incorporated herein by reference as if reproduced in its entirety.

TECHNICAL FIELD

The present disclosure relates generally to information security, and more specifically to network access control.

BACKGROUND

One of the technical challenges with existing computer systems is that a large number of devices connected to the network may not support 802.1x for authentication. This results in utilizing Media Access Control (MAC) Authentication Bypass (MAB) as a fallback authentication method for devices that do not support 802.1x. If authentication of a device fails 802.1x verification on a network port, the port will then attempt to authenticate the device via MAB. MAB uses the MAC address of the device to determine if the device should be granted access to the network. However, unlike 802.1x, MAB is not a strong authentication method. For example, MAB can be defeated by spoofing the MAC address of a valid device. MAB utilizes a database of valid devices referred to as a whitelist. In existing computer systems, access to the whitelist is not tightly controlled and users are able to add devices to groups they are not part of. This means that a bad actor can add the MAC address of a device to the whitelist to gain unauthorized access to the computer system.

Another technical challenge that occurs in the computer system is controlling data leakage and unauthorized access to data. For example, as discussed above, a bad actor (e.g. a hacker) may connect a network device to a network to extract data and/or to perform other malicious activities. Identifying malicious network devices in a large network also poses several technical challenges. Existing systems typically monitor the network for suspicious activity after a malicious network device is connected to the network. In these systems, since the malicious device is already connected to the network, the malicious network device is able to extract data and/or perform malicious activities before it is detected. Existing systems are unable to preemptively identify malicious network device before they can access a network which limits their abilities to provide information security and to control and monitor data access within the network.

Without the ability to control or monitor data access and movement the system is vulnerable to having sensitive data leave the network and/or allowing malicious data (e.g. viruses and spyware) to enter the network. Thus, it is desirable to provide a solution that provides the ability to control and monitor data access and movement within a network.

SUMMARY

One of the technical challenges with existing computer systems is that a large number of devices connected to the network may not support 802.1x for authentication. This results in utilizing Media Access Control (MAC) Authentication Bypass (MAB) as a fallback authentication method for devices that do not support 802.1x. If authentication of a device fails 802.1x verification on a network port, the port will then attempt to authenticate the device via MAB. MAB uses the MAC address of the device to determine if the device should be granted access to the network. However, unlike 802.1x, MAB is not a strong authentication method. For example, MAB can be defeated by spoofing the MAC address of a valid device. MAB utilizes a database of valid devices referred to as a whitelist. In existing computer systems, access to the whitelist is not tightly controlled and users are able to add devices to groups they are not part of. This means that a bad actor can add the MAC address of a device to the whitelist to gain unauthorized access to the computer system.

Another technical challenge that occurs in the computer system is controlling data leakage and unauthorized access to data. For example, as discussed above, a bad actor (e.g. a hacker) may connect a network device to a network to extract data and/or to perform other malicious activities. Identifying malicious network devices in a large network also poses several technical challenges. Existing systems typically monitor the network for suspicious activity after a malicious network device is connected to the network. In these systems, since the malicious device is already connected to the network, the malicious network device is able to extract data and/or perform malicious activities before it is detected. Existing systems are unable to preemptively identify malicious network device before they can access a network which limits their abilities to provide information security and to control and monitor data access within the network. Without the ability to control or monitor data access and movement the system is vulnerable to having sensitive data leave the network and/or allowing malicious data (e.g. viruses and spyware) to enter the network.

The system described in the present application provides a technical solution to the technical problems discussed above by employing an access control process that detects when a malicious device attempts to connect to the network. The disclosed system provides several advantages which include the ability to identify and block malicious devices before they are able to access a computer system to perform malicious activities such as data exfiltration.

In one embodiment, the system is configured to use information (e.g. a MAC address, a device type, and port information) about a device that requests network access to determine whether to allow the device to access the network. When the system determines that the MAC address of the device is known to the system, the system verifies that the device information matches previous stored device information for the device. The system allows the device to access the network when the received device information matches the previously stored device information. Otherwise, the system blocks network access for the device when the received device information does not match the previously stored device information for the device. When the system determines that the MAC address of the device is new to the system, the system determines whether to allow the device to access the network based on the device type of the device. For example, the system may determine whether the device type of the device corresponds with an infrastructure device, a blacklisted device, a pending approval device, or an approved device. The system determines whether to block or allow access to the network based on the device category the device type corresponds with. This process allows the system to provide access to trusted devices while protecting itself and the network from malicious devices.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The system described in the present application provides a technical solution that employs an access control process for detecting when a malicious device attempts to connect to the network. The disclosed system provides several advantages which include the ability to identify and block malicious devices before they are able to access a computer system to perform malicious activities such as data exfiltration.

Figure 1:
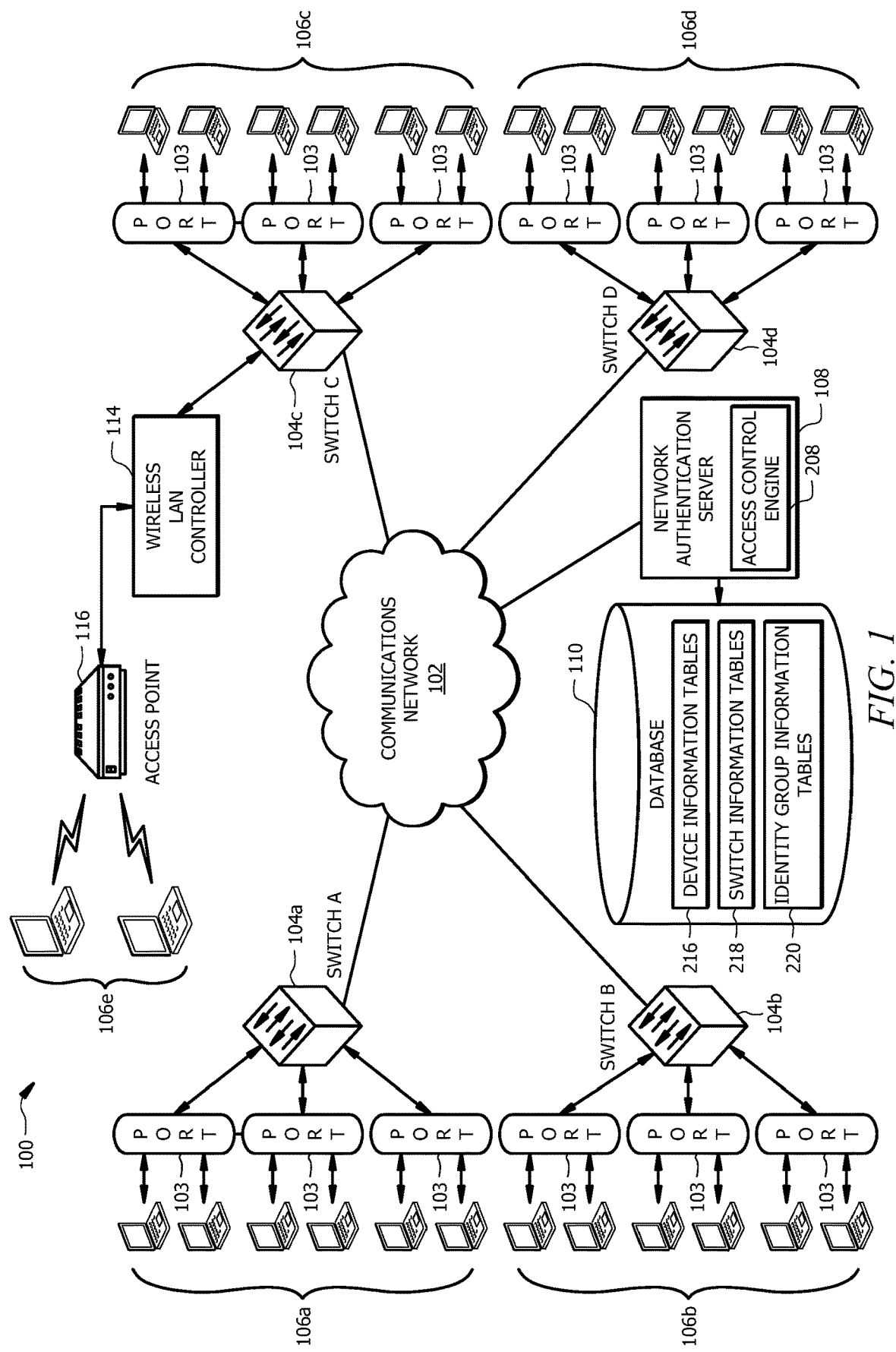
FIG. 1 is a schematic diagram of an embodiment of a system configured to implement network access control.

FIG. 1 is a schematic diagram of an embodiment of a system 100 configured to implement network access control. System 100 is generally configured to support a number of different operations, including but not limited to, identifying unknown or undesirable devices (e.g., non-compliant, rogue, or malicious devices) and blocking the undesirable devices from being able to access the network. For example, the system 100 is configured to detect when a bad actor connects a malicious device to port on a switch. The system 100 is configured to identify the malicious device and to block the malicious device from accessing the network.

In one embodiment, the system 100 is configured to use information about an endpoint device 106, for example a MAC address, a device type, and port information, to determine whether to allow the endpoint device 106 to access a network 102. When the system 100 determines that the MAC address of the endpoint device 106 is known to the system 100, the system 100 verifies that the device information matches previously stored device information for the endpoint device 106. The system 100 allows the endpoint device 106 to access the network 102 when the received device information matches the previously stored device information. Otherwise, the system 100 blocks network access for the endpoint device 106 when the received device information does not match the previously stored device information for the endpoint device 106. When the system 100 determines that the MAC address of the endpoint device 106 is new to the system 100, the system 100 determines whether to allow the endpoint device 106 to access the network 102 based on the device type of the endpoint device 106. For example, the system 100 may determine whether the device type of the endpoint device 106 corresponds with an infrastructure device, a blacklisted device, a pending approval device, or an approved device. The system 100 determines whether to block or allow access to the network 102 based on the device category the device type corresponds with. This process allows the system 100 to provide access to trusted devices while protecting itself and the network 102 from malicious devices.

System 100 comprises switches 104, endpoint devices 106, a network authentication server (NAS) 108, a database 110, a wireless LAN controller 114, and an access point 116 interconnected by one or more networks, represented by communications network 102. System 100 may be configured as shown in FIG. 1 or in any other suitable configuration as would be appreciated by one of ordinary skill in the art upon viewing this disclosure.

Communications Network

The communications network 102 represents communication equipment, including hardware and any appropriate controlling logic, for interconnecting elements and facilitating communication between interconnected elements. The communications network 102 may include local area networks (LANs), metropolitan area networks (MANs), wide area networks (WANs), any other public or private network, local, regional, or global communication network such as the Internet, enterprise intranet, other suitable wired or wireless communication link, or any combination thereof. The communications network 102 may include any combination of gateways, routers, hubs, switches, access points, base stations, and any other hardware, software, or a combination of the preceding that may implement any suitable protocol. The communications network 102 may include other types of networks, including wireless or wired networks.

The communications network 102 is configured to interconnect the switches 104, the endpoint devices 106, the NAS 108, the database 110, the wireless LAN controller 114, and the access point 116. The use of the communications network 102 facilitates identifying and blocking undesirable devices regardless of the geographic location or communication protocols employed by network components or devices on the network. While only one communications network 102 has been illustrated, it should be understood that other embodiments may operate using multiple communications networks 102. In addition, other embodiments may employ one or more wired and wireless networks in communications networks 106.

Network Switches

System 100 comprises switches 104a, 104b, 104c, and 104d operably coupled to the communications network 102. The switches 104 represent communication equipment, including hardware and any appropriate controlling logic, for interconnecting and facilitating data communication to and from endpoint devices 106. Examples of switches 104 include, but are not limited to, gateways, call managers, routers, hubs, switches, access points, base stations, cellular towers, radio networks, and satellite telephone equipment implementing appropriate protocols for wireless telephony communications. While only a select number of switches 104 have been illustrated, it should be understood that other embodiments may operate using any suitable number of switches 104. In addition, other embodiments may incorporate switches 104 in other wired or wireless networks coupled to the communications network 102 of system 100. Each network switch 104 comprises a plurality of ports 103 configured to provide network access for one or more endpoint devices 106.

Access Points

The access point 116 is any network hardware device (and accompanying software) that allows an endpoint device 106 to connect to the communications network 102. An example of the access point 116 includes, but is not limited to, a router. The access point 116 may allow for both wireless connections and wired connections to the communications network 102. For example, an endpoint device 106 may connect wirelessly to the access point 116 or may connect to the access point 116 via a wired connection (e.g. an Ethernet cable). The system 100 may comprise any suitable number of access points 116.

Wireless LAN Controllers

The wireless LAN controller 114 is configured to control and manage the access points 116. For example, the wireless LAN controller 114 may configure the access points 116 to connect to communications network 102. In some embodiments, the wireless LAN controller 114 may screen wireless connection attempts to the communications network 102 and may block attempts that are deemed suspicious or compromised. For example, the wireless LAN controller 114 may maintain a blacklist that identifies endpoint devices 106 that should be blocked from connecting wirelessly to the communications network 102. The wireless LAN controller 114 can connect to the access point 116 and vice versa to allow for end point devices 106 to connect to the communications network 102 via the access point 116 and wireless LAN controller 114. In FIG. 1, the wireless LAN controller 114 is shown operably coupled to a single access point 116. In other examples, the wireless LAN controller 114 may be configured to manage and control any number of access points 116 of system 100.

Endpoint Devices

System 100 comprises endpoint devices 106a, 106b, 106c, 106d, and 106e operably coupled to the communications network 102 through switches 104. The endpoint devices 106 represent any suitable hardware, including appropriate controlling logic and data, capable of connecting to and communicating data over a network. For example, endpoint devices 106 may include wired or wireless devices including, but not limited to, workstations, laptops or notebook computer systems, printers, Voice over Internet Protocol (VoIP) telephones, Internet Protocol (IP) phones, mobile telephones, advanced phones (e.g. smartphones), personal digital assistants (PDAs), wireless handsets, notebook computer systems, tablet computer systems, embedded devices, network sniffers, auxiliary devices, printers, card readers, or any other suitable type of device. The endpoint devices 106 may be capable of transmitting and receiving any forms of media including, but not limited to, audio, video, images, text messages, and other data formats, and documents and accessing disparate network-based services.

Network Authentication Servers

The NAS 108 represents any appropriate combination of hardware, controlling logic, and data that facilitates user authentication, admission control and logging, policy enforcement, auditing, and security associated with the communications network 102. Additional information about the NAS 108 is described in FIG. 2. Examples of the NAS 108 in operation are described in FIGS. 6A, 6B, and 7. In some embodiments, the NAS 108 may represent a networked server or collection of networked servers. The NAS 108 may be directly or indirectly coupled to other systems such as the database 110 to store and retrieve information related to network access control and authentication. In one embodiment, the NAS 108 is configured to track attempted and actual connections by endpoint devices 106 to the communications network 102 using switches 104. For example, the NAS 108 may monitor and track the MAC address and/or IP address associated with endpoint devices 106 on communications network 102 and the IP address and/or port of the switch 104 coupled to those endpoint devices 106.

The NAS 108 is configured to authenticate endpoint devices 106 that are connected to a port 103 of a switch 104. The NAS 108 may authenticate endpoint device 106 using an 802.1X protocol, a MAC authentication Bypass (MAB) whitelist, the process described in FIGS. 6A, 6B, and 7, or any other suitable protocol. For example, the NAS 108 may be configured to determine whether the MAC address of an endpoint device 106 is present in a MAB whitelist. The NAS 108 may authenticate the endpoint device 106 when the endpoint device 106 is present in the MAB whitelist. The NAS 108 may also be configured to automatically fail authentication for endpoint devices 106 that are present in a blacklist. In certain implementations, the NAS 108 may log appropriate information about each network access attempt by endpoint devices 106 by communicating with database 110. For example, the NAS 108 may log information about endpoint devices 106 that pass or fail authentication in a device log file.

The NAS 108 may communicate commands to the switch 104 to block an endpoint device 106, either logically or physically, from accessing the communications network 102. The NAS 108 is configured to send one or more commands to logically and/or physically block or isolate the endpoint device 106 from the communications network 102. In one embodiment, logically disabling or blocking an endpoint device 106 may involve blackholing the endpoint device 106. Blackholing refers to discarding or dropping frames associated with communications from a particular endpoint device 106. In another embodiment, disabling or blocking an endpoint device 106 may involve physically disconnecting an endpoint device 106 from the communications network 102. For example, the NAS 108 is configured to send one or more disable commands that triggers a switch 104 to shut off electrical power to the port 103 of the switch 104 that is connected to the endpoint device 106. In one embodiment, this process involves transforming the port 103 from an active (e.g. ON) state to an inactive (e.g. OFF) state. Depending on the network architecture and the type of other endpoint devices 106 that are connected to the same port 103 on the switch 104, physically disconnecting the port 103 may be a viable option to disconnect an undesirable endpoint device 106 from accessing the communications network 102. In another embodiment, logically disabling or blocking an endpoint device 106 may involve rerouting data traffic associated with the endpoint device 106 to a safe zone. A safe zone refers to a network location that is deemed to be safe to receive traffic from an untrusted device. For example, a safe zone may represent an empty port 103 or a port 103 on a switch 104 that is connected to devices with acceptable levels of risk, such as a VoIP phone, a printer, or a display. Rerouting traffic associated with an endpoint device 106 to a safe zone mitigates the impact of malicious activity. In one embodiment, a safe zone may also be a network traffic monitoring server that enables live monitoring, recording, and/or forensic analysis of data traffic associated with an endpoint device 106.

Databases

The database 110 comprises suitable hardware and software, including memory and control logic, for storing, accessing, retrieving, and communicating various types of information, for example, network activity data. Although FIG. 1 illustrates a single database 110, the system 100 may comprise any suitable number of databases 110. The database 110 may include any suitable combination of volatile or non-volatile, local or remote devices suitable for storing and maintaining information. For example, the database 110 may include random access memory (RAM), read only memory (ROM), solid state storage devices, magnetic storage devices, optical storage devices, or any other suitable information storage device or a combination of such devices. In one embodiment, the database 110 represents a relational database for storing connection logs and network activity logs of endpoints 106 in a retrievable manner. In some embodiments, the database 110 may represent a database service provided by a third-party.

In one embodiment, the database 110 may represent a database for storing all connection details related to endpoint devices 106. Examples of information stored in the database 110 include, but are not limited to, device information tables 216, switch information tables 218, identity group information tables 220, device information, device status information, MAC addresses, device types, device category information, port information (e.g. port status information), switch information, and/or any other suitable type of information. Additional information about device information tables 216, switch information tables 218, and identity group information tables 220 is described in FIGS. 3, 4, and 5, respectively. As an example, the database 110 may maintain network activity information such as IP addresses and MAC addresses associated with endpoint devices 106 and IP addresses of switches 104 coupled to particular endpoint devices 106. The database 110 may also maintain port information (e.g. port addresses) for switches 104 or endpoint devices 106. The database 110 may be directly or indirectly coupled to other systems such as the NAS 108 and be capable of storing and retrieving information related to network access based on instructions from the NAS 108. In particular embodiments, the storage and functionality of database 110 may be provided by a third-party data server. In some embodiments, the database 110 may reside on a network authentication server, such as the NAS 108.

Network Authentication Server Hardware Configuration

Figure 2:
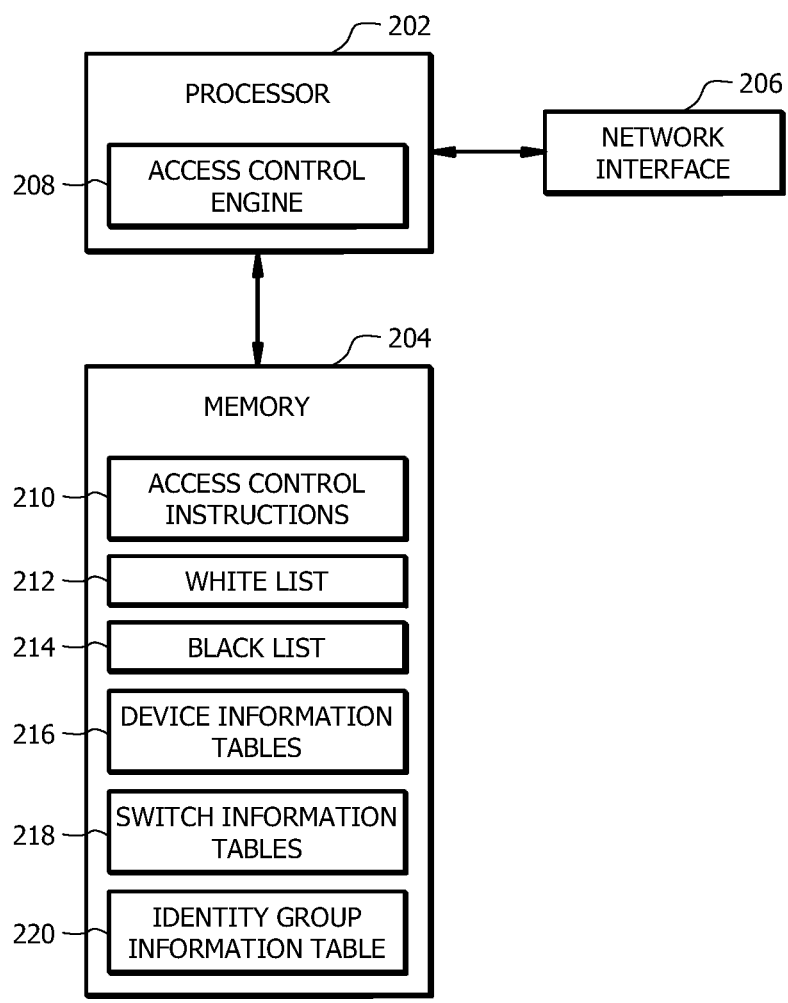
FIG. 2 is a schematic diagram of an embodiment of a network authentication server configured to implement network access control.

FIG. 2 is a schematic diagram of an embodiment of a NAS 108. The NAS 108 comprises a processor 202, a memory 204, and a network interface 206. The NAS 108 may be configured as shown or in any other suitable configuration.

The processor 202 comprises one or more processors operably coupled to the memory 204. The processor 202 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The processor 202 is communicatively coupled to and in signal communication with the memory 204. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement an access control engine 208. In an embodiment, the access control engine 208 is implemented using logic units, FPGAs, ASICs, DSPs, or any other suitable hardware.

In one embodiment, the access control engine 208 is configured to determine that an undesirable endpoint device 106 is connected to a port 103 of a switch 104 and to block the endpoint device 106 from accessing the communications network 102. In this example, the access control engine 208 prevents undesirable endpoint devices 106 from connecting to the communications network 102 which reduces the vulnerability of the system 100 to malicious activity performed by the undesirable device and provides improved network security. An example of the access control engine 208 operating in this configuration is described in FIGS. 6A, 6B, and 7.

The memory 204 comprises one or more disks, tape drives, or solid-state drives, and may be used as an over-flow data storage device, to store programs when such programs are selected for execution, and to store instructions and data that are read during program execution. The memory 204 may be volatile or non-volatile and may comprise ROM, RAM, ternary content-addressable memory (TCAM), dynamic random-access memory (DRAM), and static random-access memory (SRAM). The memory 204 is operable to store access control instructions 210, a whitelist 212, a blacklist 214, device information tables 216, switch information tables 218, identity group information tables 220, and/or any other data or instructions. The access control instructions 210 comprise any suitable set of instructions, logic, rules, or code operable to execute the access control engine 208.

The whitelist 212 identifies endpoint devices 106 which are known to be trustworthy and are allowed to access the communications network 102. The whitelist 121 may comprise information including, but not limited to, endpoint device identifiers, MAC addresses, IP addresses, switch identifiers, switch port addresses, time stamps, any other suitable type of information, and/or combinations thereof. An example of a whitelist 212 includes, but is not limited to, a MAB whitelist. In one embodiment, the NAS 108 is configured to automatically authenticate an endpoint device 106 that is present on the whitelist 212.

The blacklist 214 identifies endpoint devices 106 which are known to be untrustworthy and are prohibited from accessing the communications network 102. The blacklist 214 may comprise information including, but not limited to, endpoint device identifiers, MAC addresses, IP addresses, switch identifiers, switch port addresses, time stamps, any other suitable type of information, and/or combinations thereof. For example, the blacklist 214 may identify endpoint devices 106 blocked from accessing the communications network 102. The blacklist 214 may also identify ports on a switch 104 that an endpoint device 106 has been blocked from. In one embodiment, the NAS 108 is configured to automatically fail authentication for an endpoint device 106 that is present on the blacklist 214.

Figure 3:
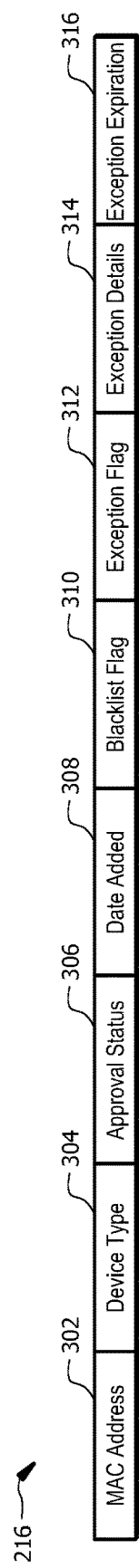
FIG. 3 is an embodiment of a device information table.

Device information tables 216 comprise information about endpoint devices 106 that have previously been authenticated and/or connected to the network 102. Referring to FIG. 3 as an example, a device information table 216 may comprise MAC address fields 302, device type fields 304, approval status fields 306, date added fields 308, blacklist flag fields 310, exception flag fields 312, exception details fields 314, and exception expiration fields 316. The MAC address field 302 identifies a MAC address for an endpoint device 106. The device type field 304 identifies a device type for an endpoint device 106. Examples of devices type may include, but are not limited to, printers, IP phones, Internet-of-Things (IoT) devices, laptops, card readers, or any other suitable type of device. The approval status field 306 identifies whether an endpoint device 106 has been previously approved for connecting with the network 102. The date added field 308 identifies a date and/or time when an endpoint device 106 was added to the device information table 216. The blacklist flag field 310 identifies whether an endpoint device 106 has been blacklisted from accessing the network 102. The exception flag field 312 identifies whether an endpoint device 106 is associated with an exception. In one embodiment, the exception flag field 312 may use different values to indicate different types of exceptions. Examples of exceptions include, but are not limited to, a duplicate MAC address exception and a one-time exception. The exception details field 314 provides information about any exceptions an endpoint device 106 is associated with. The exception expiration field 316 identifies when an exception associated with an endpoint device 106 expires. In other examples, the device information table 216 may comprise any other suitable combination of fields. For example, the device information table 216 may omit one or more fields.

Figure 4:
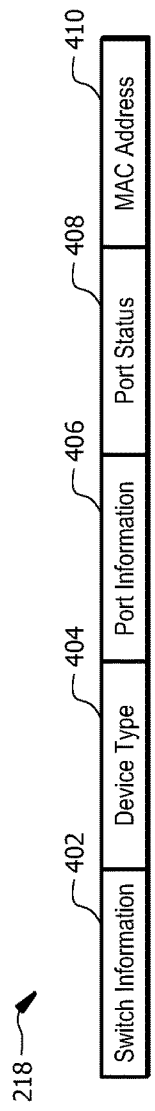
FIG. 4 is an embodiment of a switch information table.

Returning to FIG. 2, the switch information tables 218 comprise information about switches 104 and ports 103 where endpoint devices 106 are connected. Referring to FIG. 4 as an example, a switch information table 218 may comprise switch information fields 402, device type fields 404, port information fields 406, port status fields 408, and MAC address fields 410. The switch information field 402 identifies a MAC address of a switch 104. The device type field 404 identifies a device type for an endpoint device 106 that is connected to a switch 104. The port information field 406 identifies a port where an endpoint device 106 is connected. The port status field 408 identifies the current status of a port where an endpoint device 106 is connected. In one embodiment, a port 103 may have a port status of open, blocked, or pending. An open port status or state indicates that the port is configured to enable communications between an endpoint device 106 and the network 102. A blocked port status or state indicates that the port 103 is configured to disallow communications between an endpoint device 106 and the network 102. A pending port status or state indicates that the port 103 is configured to disallow communications between an endpoint device 106 and the network 102 until the endpoint device 106 has been approved to connect to the network 102. The MAC address field 410 identifies the MAC address of the endpoint device 106 connected to the switch 104. In other examples, the switch information table 218 may comprise any other suitable combination of fields. For example, the switch information table 218 may omit one or more fields.

Figure 5:
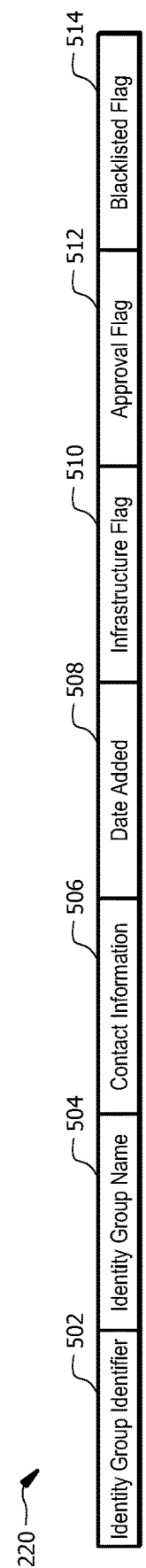
FIG. 5 is an embodiment of an identity group information table

Returning to FIG. 2, the identity group information tables 220 comprise information about device categories that are associated with particular device types. Referring to FIG. 5 as an example, an identity group information table 220 may comprise identity group identifier fields 502, identity group name fields 504, contact information fields 506, date added fields 508, infrastructure flag fields 510, approval flag fields 512, and blacklisted flag fields 514. The identity group identifier field 502 identifies an identity group identifier that is associated with a particular device type category. For example, an identity group identifier may be an alphanumeric identifier that is linked with a particular device type category. The identity group name field 504 identifies a particular device type category. The contact information field 506 identifies contact information for approval group for endpoint devices 106. An example of contact information includes, but is not limited to, an email address. The date added field 508 identifies a date and/or time when a device type was added to the identity group information table 220. The infrastructure flag field 510 identifies whether a device type is associated with an infrastructure device. Examples of infrastructure devices include, but are not limited to, routers, modems, servers, switches, or any other suitable type of connectivity device. The approval flag field 512 identifies whether a device type has been approved for connecting with the network 102. The blacklisted flag field 514 identifies whether a device type has been blacklisted or blocked from connecting with the network 102. In other examples, the identity group information table 220 may comprise any other suitable combination of fields. For example, the identity group information table 220 may omit one or more fields.

Returning to FIG. 2, the network interface 206 is configured to enable wired and/or wireless communications. The network interface 206 is configured to communicate data through the system 100, the communications network 102, and/or any other system or domain. For example, the network interface 206 may be configured for communication with a modem, a switch, a router, a bridge, a server, or a client. The processor 202 is configured to send and receive data using the network interface 206 from the communications network 102.

Network Access Control Process

Figure 6A:
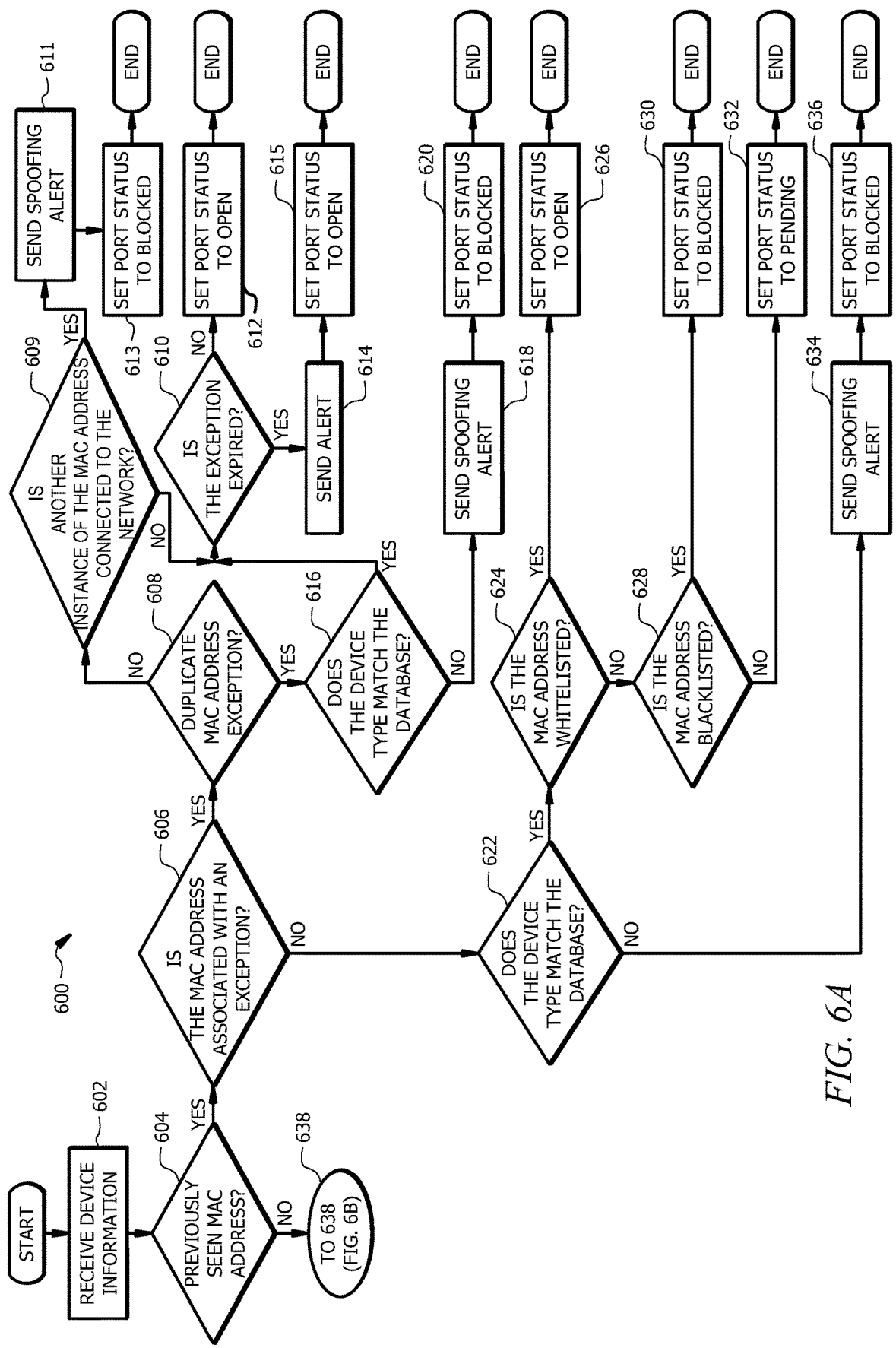
FIG. 6A is a flowchart of an embodiment of a first portion of an access control method for a network.
Figure 6B:
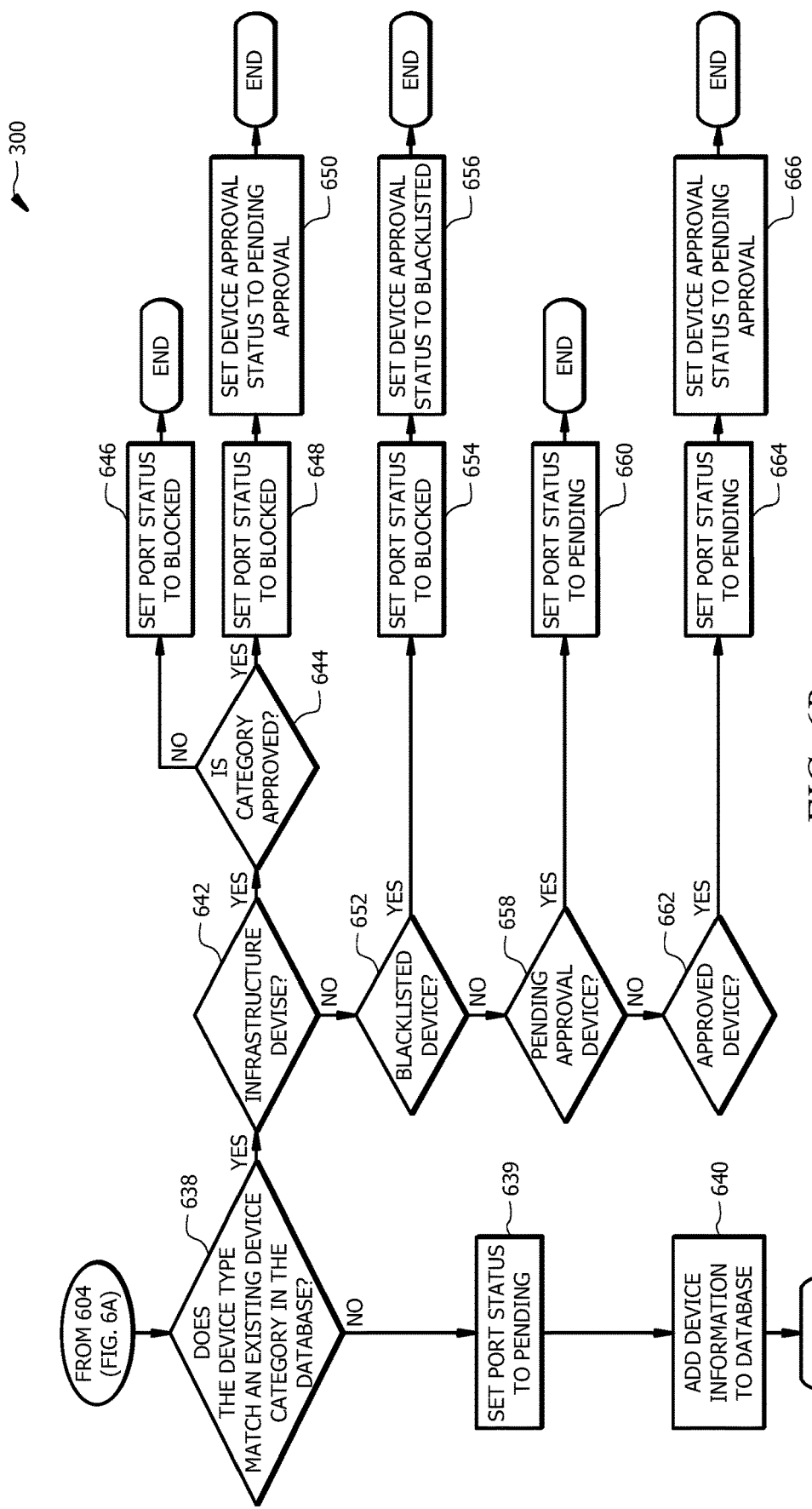
FIG. 6B is a flowchart of an embodiment of a second portion of the access control method for the network.

FIGS. 6A and 6B combine to illustrate a flowchart of an access control method 600 that is implemented by a network device (e.g. NAS 108) to provide access control to the network 102. The NAS 108 may employ method 600 when a new endpoint device 106 requests to connect to the network 102. The NAS 108 uses method 600 to determine whether to allow or block network access for the endpoint device 106 and to configure the port connected to the endpoint device 106 based on the determination.

Referring to FIG. 6A, at step 602, the NAS 108 receives device information for an endpoint device 106. For example, a switch 104 where the endpoint device 106 is connected may send device information for the endpoint device 106. In one embodiment, the NAS 108 receives a MAC address for the endpoint device 106, a device type for the endpoint device 106, and port information for where the endpoint device 106 is connected. In other examples, the NAS 108 may receive any other suitable type or combination of information associated with the endpoint device 106.

At step 604, the NAS 108 determines whether the received MAC address has been seen before. For example, the NAS 108 may compare the received MAC address to the MAC addresses in device information table 216. The NAS 108 determines that the received MAC address has been seen before when the received MAC address matches a MAC address in the device information table 216. The NAS 108 proceeds to step 638, which is described in FIG. 6B, in response to determining that the received MAC address has not been previously seen. Otherwise, the NAS 108 proceeds to step 606 in response to determining that the received MAC address has been previously seen.

At step 606, the NAS 108 determines whether the received MAC address is associated with an exception. For example, the NAS 108 may determine whether the entry for the MAC address in the device information table 216 is associated with any exceptions by checking the exception flag field 312. The NAS 108 proceeds to step 608 in response to determining that the received MAC address is associated with an exception. Otherwise, the NAS 108 proceeds to step 622 in response to determining that the received MAC address is not associated with an exception.

At step 608, the NAS 108 determines whether the MAC address exception is a duplicate MAC address exception. For example, the NAS 108 may determine whether the entry associated with the MAC address is associated with an exception for a duplicate MAC address by checking the exception details field 314. In another embodiment, the NAS 108 may determine whether the entry associated with the MAC address is associated with an exception for a duplicate MAC address based on the value in the exception flag field 312. A duplicate MAC address exception is an exception that allows multiple instances of a MAC address to be connected the network 102 at once. The NAS 108 proceeds to step 609 in response to determining that the MAC address exception is not a duplicate MAC address. Otherwise, the NAS 108 proceeds to step 616 in response to determining that the MAC address exception is a duplicate MAC address.

At step 609, the NAS 108 determines whether another instance of the MAC address is currently connected to the network 102. For example, the NAS 108 may query the switch 104 whether any other instances of the MAC address are connected to the network 102 based on the information in the switch information tables 218. The NAS 108 proceeds to step 611 in response to determining that another instance of the MAC address is currently connected to the network 102. Otherwise, the NAS 108 proceeds to step 610 in response to determining that no other instances of the MAC address are currently connected to the network 102.

At step 611, the NAS 108 sends a spoofing alert. The NAS 108 may send a spoofing alert that indicates that the MAC address has been spoofed. Examples of a spoofing alert include, but are not limited to, an application pop-up, an email, or any other suitable type of alert.

At step 613, the NAS 108 sets the port status to a blocked state. Here, the NAS 108 configures the port 103 to block the endpoint device 106 from accessing the network 102 via the port connection. An example of updating the port status is described in FIG. 7. In one embodiment, the NAS 108 may update an entry in the switch information table 218 with the port status change. For example, the NAS 108 may update the port status field 408 for the port 103 where the endpoint device 106 is connected.

The NAS 108 may be further configured to send one or more commands that prevent the endpoint device 106 from communicating with other devices in the network 102 in response to setting the port status to the blocked state. In one embodiment, the NAS 108 sends a blackhole command identifying the endpoint device 106 to the switch 104. For example, the blackhole command may comprise the MAC address for the endpoint device 106. The switch 104 is configured to transform the destination traffic associated with the endpoint device 106 to a null destination in response to receiving the blackhole command. In another embodiment, the switch 104 is configured to discard traffic associated with the endpoint device 106 in response to receiving the blackhole command. In another embodiment, the threat management server 112 sends a disable command identifying the endpoint device 106 to the switch 104. The switch 104 is configured to disable the port on the switch 104 that the endpoint device 106 is connected to in response to receiving the disable command. For example, the switch 104 may logically disable the port or transition the port to an inactive state. In another embodiment, the switch 104 is configured to disconnect electrical power to the port on the switch 104 that the endpoint device 106 is connected to in response to receiving the disable command. For example, the switch 104 may actuate an electronic switch to disconnection electrical power to the port. In other examples, the switch 104 may disable the port using any other suitable technique as would be appreciated by one of ordinary skill in the art. In other embodiments, the threat management server 112 may block the endpoint device 106 from accessing the communications network 102 using any other suitable technique as would be appreciated by one of ordinary skill in the art.

Returning to step 609, the NAS 108 proceeds to step 610 in response to determining that no other instances of the MAC address are currently connected to the network 102. At step 610, the NAS 108 determines whether the MAC address exception has expired. Here, the NAS 108 may use information provided by the device information table 216 to determine whether the MAC address exception has expired. For example, the exception expiration field 316 in the device information table 216 may indicate a time interval when the MAC address exception is valid and the NAS 108 may determine whether the current time is within the time interval indicated by the exception expiration field 316. In other examples, the NAS 108 may use any other suitable information for determining whether the MAC address exception has expired. The NAS 108 proceeds to step 612 in response to determining that the MAC address exception has not expired. Otherwise, the NAS 108 proceeds to step 614 in response to determining that the MAC address exception has expired.

At step 612, the NAS 108 sets the port status to an open state. Here, the NAS 108 configures the port 103 to allow the endpoint device 106 to access the network 102 via the port connection. An example of updating the port status is described in FIG. 7. In one embodiment, the NAS 108 may update an entry in the switch information table 218 with the port status change. For example, the NAS 108 may update the port status field 408 for the port 103 where the endpoint device 106 is connected.

Returning to step 610, the NAS 108 proceeds to step 614 in response to determining that the MAC address exception has expired. At step 614, the NAS 108 sends an alert that indicates that the MAC address exception has expired. Examples of an alert include, but are not limited to, an application pop-up, an email, or any other suitable type of alert.

At step 615, the NAS 108 sets the port status to an open state. Here, the NAS 108 configures the port 103 to allow the endpoint device 106 to access the network 102 via the port connection. An example of updating the port status is described in FIG. 7. In one embodiment, the NAS 108 may update an entry in the switch information table 218 with the port status change. For example, the NAS 108 may update the port status field 408 for the port 103 where the endpoint device 106 is connected.

Returning to step 608, the NAS 108 proceeds to step 616 in response to determining that the MAC address exception is for a duplicate MAC address. At step 616, the NAS 108 determines whether the received device type matches the device type identified in the device information table 216 for the MAC address. Here, the NAS 108 compares the received device type to the device type field 304 that is associated with the MAC address of the endpoint device 106. The NAS 108 proceeds to step 610 in response to determining that the received device type matches the device type stored in the device information table 216. Otherwise, the NAS 108 proceeds to step 618 in response to determining that the received device type does not match the device type stored in the device information table 216.

At step 618, the NAS 108 sends a spoofing alert. The NAS 108 may send a spoofing alert that indicates that the MAC address has been spoofed. Examples of a spoofing alert include, but are not limited to, an application pop-up, an email, or any other suitable type of alert.

At step 620, the NAS 108 sets the port status to a blocked state. Here, the NAS 108 configures the port 103 to block the endpoint device 106 from accessing the network 102 via the port connection. An example of updating the port status is described in FIG. 7. In one embodiment, the NAS 108 may update an entry in the switch information table 218 with the port status change. For example, the NAS 108 may update the port status field 408 for the port 103 where the endpoint device 106 is connected.

The NAS 108 may be further configured to send one or more commands that prevent the endpoint device 106 from communicating with other devices in the network 102 in response to setting the port status to the blocked state. The NAS 108 may send commands using a process similar to the process described in step 613. Returning to step 606, the NAS 108 proceeds to step 622 in response to determining that the received MAC address is not associated with an exception. At step 622, the NAS 108 determines whether the received device type matches the device type identified in the device information table 216 for the MAC address. Here, the NAS 108 compares the received device type to the device type field 304 that is associated with the MAC address of the endpoint device 106. The NAS 108 proceeds to step 624 in response to determining that the received device type matches the device type stored in the device information table 210. Otherwise, the NAS 108 proceeds to step 634 in response to determining that the received device type does not match the device type stored in the device information table 210.

At step 624, the NAS 108 determines whether the MAC address is whitelisted. Here, the NAS 108 compares the received MAC address to the MAC address in a whitelist 212. The NAS 108 determines that the received MAC address is present in the whitelist 212 when the received MAC address matches a MAC address in the whitelist 212. The NAS 108 proceeds to step 626 in response to determining that the MAC address is whitelisted. Otherwise, the NAS 108 proceeds to step 628 in response to determining that the MAC address is not whitelisted.

At step 626, the NAS 108 sets the port status to an open state. Here, the NAS 108 configures the port 103 to allow the endpoint device 106 to access the network 102 via the port connection. In one embodiment, the NAS 108 may update an entry in the switch information table 218 with the port status change. For example, the NAS 108 may update the port status field 408 for the port 103 where the endpoint device 106 is connected.

Returning to step 624, the NAS 108 proceeds to step 628 in response to determining that the MAC address is not whitelisted. At step 628, the NAS 108 determines whether the MAC address is blacklisted. In one embodiment, the NAS 108 determines whether the MAC address is blacklisted based on the value of the blacklist flag field 310 in the device information table 216. In another embodiment, the NAS 108 compares the received MAC address to the MAC address in a blacklist 214. The NAS 108 determines that the received MAC address is present in the blacklist 214 when the received MAC address matches a MAC address in the blacklist 214. The NAS 108 proceeds to step 630 in response to determining that the MAC address is blacklisted. Otherwise, the NAS 108 proceeds to step 632 in response to determining that the MAC address is not blacklisted.

At step 630, the NAS 108 sets the port status to a blocked state. Here, the NAS 108 configures the port 103 to block the endpoint device 106 from accessing the network 102 via the port connection. In one embodiment, the NAS 108 may update an entry in the switch information table 218 with the port status change. For example, the NAS 108 may update the port status field 408 for the port 103 where the endpoint device 106 is connected.

Returning to step 628, the NAS 108 proceeds to step 632 in response to determining that the MAC address is not blacklisted. At step 632, the NAS 108 sets the port status to a pending state. Here, the NAS 108 configures the port 103 to block the endpoint device 106 from accessing the network 102 until the endpoint device 106 has been approved by a system administrator. Setting the port status to pending isolates the endpoint device 106 for further review. In one embodiment, the NAS 108 may update an entry in the switch information table 218 with the port status change. For example, the NAS 108 may update the port status field 408 for the port 103 where the endpoint device 106 is connected.

Returning to step 622, the NAS 108 proceeds to step 634 in response to determining that the received device type does not match the device type stored in the device information table 216. At step 634, the NAS 108 sends a spoofing alert. The NAS 108 may send a spoofing alert using a process similar to the process described in step 618.

At step 636, the NAS 108 sets the port status to a blocked state. Here, the NAS 108 configures the port 103 to block the endpoint device 106 from accessing the network 102 via the port connection. In one embodiment, the NAS 108 may update an entry in the switch information table 218 with the port status change. For example, the NAS 108 may update the port status field 408 for the port 103 where the endpoint device 106 is connected.

The NAS 108 may be further configured to send one or more commands that prevent the endpoint device 106 from communicating with other devices in the network 102 in response to setting the port status to the blocked state. The NAS 108 may send commands using a process similar to the process described in step 613.

Referring to FIG. 6B, at step 638, the NAS 108 determines whether the received device type matches an existing device type category in the identity group information table 220. Here, the NAS 108 compares the received device type to the device type categories in the identity group name field 504 of the identity group information table 220. The NAS 108 proceeds to step 639 in response to determining that the received device type does not match an existing device type category in identity group information table 220. Otherwise, the NAS 108 proceeds to step 642 in response to determining that the received device type matches an existing device type category in the identity group information table 220.

At step 639, the NAS 108 sets the port status to a pending state. Here, the NAS 108 configures the port 103 to block the endpoint device 106 from accessing the network 102 until the endpoint device 106 has been approved by a system administrator. In one embodiment, the NAS 108 may update an entry in the switch information table 218 with the port status change. For example, the NAS 108 may update the port status field 408 for the port 103 where the endpoint device 106 is connected.

At step 640, the NAS 108 adds the received device information to the device information table 216. For example, the NAS 108 may generate an entry in the device information table 216 that includes the MAC address of the endpoint device 106 in the MAC address field 302, the device type of the endpoint device 106 in the device type field 304, a pending approval status for the approval status field 306, and the current date for the date added field 308.

Returning to step 638, the NAS 108 proceeds to step 642 in response to determining that the received device information matches an existing device type category in the identity group information table 220. At step 642, the NAS 108 determines whether the determined device type category corresponds with an infrastructure device. Here, the NAS 108 determines whether the device type category corresponds with an infrastructure device based on the infrastructure flag field 510 in the identity group information table 220. The NAS 108 determines that the endpoint device 106 is an infrastructure device when the infrastructure flag field 510 indicates that the device type category is an infrastructure device. The NAS 108 proceeds to step 644 in response to determining that the determined device type category corresponds with an infrastructure device. Otherwise, the NAS 108 proceeds to step 652 in response to determining that the determined device type category does not correspond with an infrastructure device.

At step 644, the NAS 108 determines whether the determined device type category corresponds with an approved device type. Here, the NAS 108 determines whether the device type category corresponds with an approved device type based on the approval flag field 512 in the identity group information table 220. The NAS 108 determines that the endpoint device 106 is an approved device when the approval flag field 512 indicates that the device type category is an approved device. The NAS 108 proceeds to step 646 in response to determining that the determined device type category does not correspond with an approved device type. Otherwise, the NAS 108 proceeds to step 648 in response to determining that the determined device type category corresponds with an approved device type.

At step 646, the NAS 108 sets the port status to a blocked state. Here, the NAS 108 configures the port 103 to block the endpoint device 106 from accessing the network 102 via the port connection. In one embodiment, the NAS 108 may update an entry in the switch information table 218 with the port status change. For example, the NAS 108 may update the port status field 408 for the port 103 where the endpoint device 106 is connected.

Returning to step 644, the NAS 108 proceeds to step 648 in response to determining that the determined device type category corresponds with an approved device type. At step 648, the NAS 108 sets the port status to a blocked state. Here, the NAS 108 configures the port 103 to block the endpoint device 106 from accessing the network 102 via the port connection. In one embodiment, the NAS 108 may update an entry in the switch information table 218 with the port status change. For example, the NAS 108 may update the port status field 408 for the port 103 where the endpoint device 106 is connected.

At step 650, the NAS 108 sets the device's approval status to pending approval. Here, the NAS 108 configures the port 103 to block the endpoint device 106 from accessing the network 102 until the endpoint device 106 has been approved by a system administrator. In one embodiment, the NAS 108 may send a message that includes device information for the endpoint device 106 to a system administrator in response to setting the device's approval status to pending approval. For example, the NAS 108 may send an email with device information for the endpoint device 106 to notify the system administrator about the endpoint device 106. The NAS 108 may send the messaging using contact information provided in the contact information field 506 of the identity group information table 220.

In one embodiment, the NAS 108 may update an entry in the switch information table 218 with the port status change. For example, the NAS 108 may update the port status field 408 for the port 103 where the endpoint device 106 is connected. The NAS 108 may generate an entry in the device information table 216 that includes the MAC address of the endpoint device 106 in the MAC address field 302, the device type of the endpoint device 106 in the device type field 304, a pending approval status for the approval status field 306, and the current date for the date added field 308.

Returning to step 642, the NAS 108 proceeds to step 652 in response to determining that the determined device type does not correspond with an infrastructure device. At step 652, the NAS 108 determines whether the determined device type category corresponds with a blacklisted device. Here, the NAS 108 determines whether the device type category corresponds with a blacklisted device based on the blacklisted flag field 514 in the identity group information table 220. The NAS 108 determines that the endpoint device 106 is a blacklisted device when the blacklist flag field 514 indicates that the device type category is a blacklisted device. The NAS 108 proceeds to step 654 in response to determining that the determined device type category corresponds with a blacklisted device type. Otherwise, the NAS 108 proceeds to step 658 in response to determining that the determined device type category does not correspond with a blacklisted device type At step 654, the NAS 108 sets the port status to a blocked state. Here, the NAS 108 configures the port 103 to block the endpoint device 106 from accessing the network 102 via the port connection. In one embodiment, the NAS 108 may update an entry in the switch information table 218 with the port status change. For example, the NAS 108 may update the port status field 408 for the port 103 where the endpoint device 106 is connected.

At step 656, the NAS 108 sets the device's approval status to blacklisted. The NAS 108 may generate an entry in the device information table 216 that includes the MAC address of the endpoint device 106 in the MAC address field 302, the device type of the endpoint device 106 in the device type field 304, a pending approval status for the approval status field 306, the current date for the date added field 308, and a value that indicates the endpoint device 106 is blacklisted in the blacklist flag field 310.

Returning to step 652, the NAS 108 proceeds to step 658 in response to determining that the determined device type category does not correspond with a blacklisted device type. At step 658, the NAS 108 determines whether the determined device type category corresponds with a pending approval device. Here, the NAS 108 determines whether the device type category corresponds with a pending approval device based on the approval flag field 512. The NAS 108 determines that the endpoint device 106 is a pending approval device when the approval flag field 512 indicates that the device type category is a pending approval device type. The NAS 108 proceeds to step 660 in response to determining that the determined device type category corresponds with a pending approval device type. Otherwise, the NAS 108 proceeds to step 662 in response to determining that the determined device type category does not correspond with a pending approval device type At step 660, the NAS 108 sets the port status to a pending state. Here, the NAS 108 configures the port 103 to block the endpoint device 106 from accessing the network 102 until the endpoint device 106 has been approved by a system administrator. In one embodiment, the NAS 108 may update an entry in the switch information table 218 with the port status change. For example, the NAS 108 may update the port status field 408 for the port 103 where the endpoint device 106 is connected.

Returning to step 658, the NAS 108 proceeds to step 662 in response to determining that the determined device type category does not correspond with a pending approval device type. At step 662, the NAS 108 determines that the determined device type category corresponds with an approved device and proceeds to step 664.

At step 664, the NAS 108 sets the port status to pending. Here, the NAS 108 configures the port 103 to block the endpoint device 106 from accessing the network 102 until the endpoint device 106 has been approved by a system administrator. In one embodiment, the NAS 108 may update an entry in the switch information table 218 with the port status change. For example, the NAS 108 may update the port status field 408 for the port 103 where the endpoint device 106 is connected.

At step 666, the NAS 108 sets the device's approval status to pending approval. In one embodiment, the NAS 108 may send a message that includes device information for the endpoint device 106 to a system administrator using a process similar to the process described in step 650. The NAS 108 may generate an entry in the device information table 216 that includes the MAC address of the endpoint device 106 in the MAC address field 302, the device type of the endpoint device 106 in the device type field 304, a pending approval status for the approval status field 306, and the current date for the date added field 308.

Port Updating Process

Figure 7:
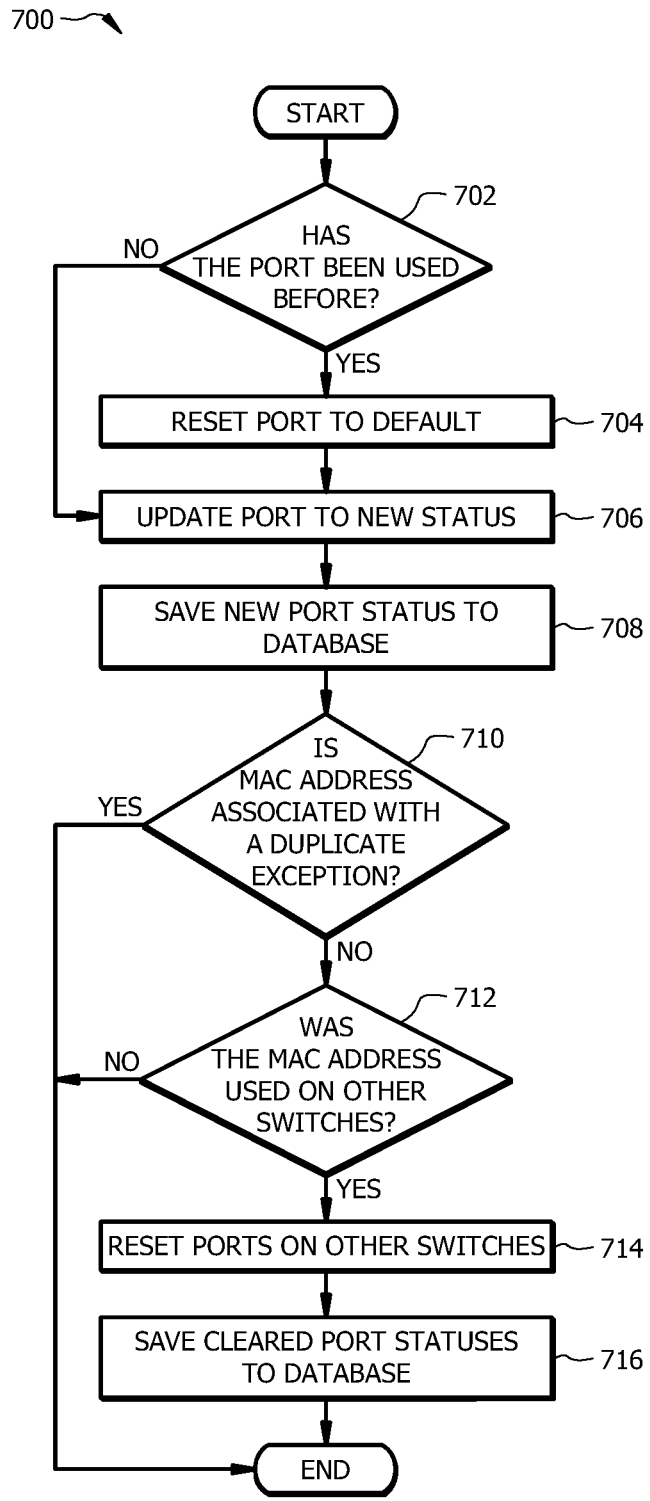
FIG. 7 is a flowchart of an embodiment of a port updating method.

FIG. 7 is a flowchart of an embodiment of a port updating method 700. The NAS 108 may employ method 700 to update or change the status of a port 103 based on a determination of whether to allow or block network access for an endpoint device 106 that is connected to the port 103.

At step 702, the NAS 108 determines whether the port 103 where the endpoint device 106 is connected to has been used before. For example, the NAS 108 may look for entries in the switch information table 218 that correspond with the port 103 where the endpoint device 106 is connected. The NAS 108 proceeds to step 704 in response to determining that the port 103 the endpoint device 106 is connected to has been used before. Otherwise, the NAS 108 proceeds to step 706 in response to determining that the port 103 the endpoint device 106 is connected to has not been used before.

At step 704, the NAS 108 resets the port 103 that the endpoint device 106 is connected to a default setting. Here, the NAS 108 resets the port 103 to a default setting to overwrite any previous settings and to configure the port 103 into a known setting.

At step 706, the NAS 108 updates the port 103 with the new status. The NAS 108 may set the port 103 based on a previously determined port status. For example, the NAS 108 may determine a port status using a process similar to the process described in FIGS. 6A-6B. The port 103 may be configured to an open state, a blocked state, a pending state, or any other suitable state. In the open state, the port 103 is configured to allow communications between an endpoint device 106 and the network 102. In the blocked state, the port 103 is configured to block communications between an endpoint device 106 and the network 102. In the pending state, the port 103 is configured to provisionally block communications between an endpoint device 106 and the network 102 until further instructions are received to transition the port 103 to either the open state or the blocked state.

At step 708, the NAS 108 saves the new port status in to the switch information table 218. Here, the NAS 108 updates the port status field 408 in the switch information table 218 with the most recent port status and configuration.

At step 710, the NAS 108 determines whether the MAC address of the endpoint device 106 is associated with a duplicate MAC address exception. For example, the NAS 108 may determine whether the entry associated with the MAC address is associated with an exception for a duplicate MAC address using a process similar to the process described in step 608 of FIG. 6A. A duplicate MAC address exception is an exception that allows multiple instances of a MAC address to be connected the network 102 at once. The NAS 108 proceeds to step 712 in response to determining that the MAC address of the endpoint device 106 is associated with a duplicate exception. Otherwise, the NAS 108 terminates method 700 in response to determining that the MAC address of the endpoint device 106 is not associated with a duplicate exception.

At step 712, the NAS 108 determines whether the MAC address of the endpoint device 106 has been used on other switches 104. Here, the NAS 108 checks the switch information table 218 for any other instances of the MAC address being used on other ports 103 and switches 104. The NAS 108 proceeds to step 714 in response to determining that the MAC address of the endpoint device 106 has been used on other switches 104. Otherwise, the NAS 108 terminates method 700 in response to determining that the MAC address of the endpoint device 106 has not been used on other switches 104.

At step 714, the NAS 108 resets the ports 103 on the other switches 104 where the endpoint device 106 was connected. The NAS 108 resets the ports 103 to clear any previous instance where the MAC address was used to connect to the network 102. The NAS 108 may send one or more signals or messages to a switch 104 to reset the ports 103. The NAS 108 may send any suitable type of signal or message to reset the ports 103 as would be appreciated by one of ordinary skill in the art.

At step 716, the NAS 108 saves the cleared port statuses to the switch information table 218. Here, the NAS 108 updates the port status field 408 in the switch information table 218 with the most recent port status and configuration for the ports 103 where the endpoint device 106 was previously connected.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An information security system, comprising:
   a switch comprising a plurality of ports configured to provide network connectivity for one or more endpoint devices to a network; and
   a device operably coupled to the switch, comprising:
      a memory operable to store a device information table comprising:
         MAC addresses of previously authenticated endpoint devices; and
         device types linked with the MAC addresses of previously authenticated endpoint devices; and
      an access control engine implemented by a processor, configured to:
         receive device information for an endpoint device connected to a port of the switch, comprising:
            a MAC address for the endpoint device; and
            a device type for the endpoint device;
         compare the MAC address for the endpoint device to MAC addresses in the device information table;
         identify a MAC address in the device information table that matches the MAC address for the endpoint device;
         identify a device type for the identified MAC address in the device information table;
         compare the device type for the endpoint device to the device type for the identified MAC address in the device information table;
         determine that the device type for the endpoint device does not match the device type for the identified MAC address in the device information table; and
         set a port status for the port to blocked in response to determining that the device type for the endpoint device does not match the device type for the identified MAC address in the device information table.

2. The system of claim 1, wherein:
   the device information table comprises exemption information linked with the MAC addresses of previously authenticated endpoint devices; and
   the access control engine is further configured to:
      identify exemption information for the identified MAC address in the device information table;
      determine the identified MAC address in the device information table is not associated with a duplicate exemption;
      determine another instance of the MAC address for the endpoint device is connected to the network; and
      set a port status for the port to blocked in response to determining that another instance of the MAC address for the endpoint device is connected to the network.

3. The system of claim 1, wherein:
   the access control engine is further configured to send a blackhole command to the switch in response to setting the port status to blocked; and
   the switch is configured to transform the destination of traffic associated with the endpoint device to a null destination in response to receiving the blackhole command.

4. The system of claim 1, wherein:
   the access control engine is further configured to send a blackhole command to the switch in response to setting the port status to blocked; and
   the switch is configured to discard traffic associated with the endpoint device in response to receiving the blackhole command.

5. The system of claim 1, wherein:
   the access control engine is further configured to send a disable command to the switch in response to setting the port status to blocked; and
   the switch is configured to disable the port the endpoint device is connected to in response to receiving the disable command.

6. The system of claim 1, wherein:
   the access control engine is further configured to send a disable command to the switch in response to setting the port status to blocked; and
   the switch is configured to disconnect electrical power to the port the endpoint device is connected to in response to receiving the disable command.

7. The system of claim 1, wherein the access control engine is further configured to send a spoofing alert in response to setting the port status to blocked.

8. An information security device, comprising:
   a memory operable to store a device information table comprising:
      MAC addresses of previously authenticated endpoint devices; and
      device types linked with the MAC addresses of previously authenticated endpoint devices; and
   an access control engine implemented by a processor, configured to:
      receive device information for an endpoint device connected to a port of a switch, comprising:
         a MAC address for the endpoint device; and
         a device type for the endpoint device;
      compare the MAC address for the endpoint device to MAC addresses in the device information table;
      identify a MAC address in the device information table that matches the MAC address for the endpoint device;
      identify a device type for the identified MAC address in the device information table;
      compare the device type for the endpoint device to the device type for the identified MAC address in the device information table;
      determine that the device type for the endpoint device does not match the device type for the identified MAC address in the device information table; and
      set a port status for the port to blocked in response to determining that the device type for the endpoint device does not match the device type for the identified MAC address in the device information table.

9. The device of claim 8, wherein:
the device information table comprises exemption information linked with the MAC addresses of previously authenticated endpoint devices; and
the access control engine is further configured to:
  identify exemption information for the identified MAC address in the device information table;
  determine the identified MAC address in the device information table is not associated with a duplicate exemption;
  determine another instance of the MAC address for the endpoint device is connected to the network; and
  set a port status for the port to blocked in response to determining that another instance of the MAC address for the endpoint device is connected to the network.

10. The device of claim 8, wherein:
the access control engine is further configured to send a blackhole command to the switch in response to setting the port status to blocked; and
the blackhole command triggers the switch to transform the destination of traffic associated with the endpoint device to a null destination.

11. The device of claim 8, wherein:
the access control engine is further configured to send a blackhole command to the switch in response to setting the port status to blocked; and
the blackhole command triggers the switch to discard traffic associated with the endpoint device.

12. The device of claim 8, wherein:
the access control engine is further configured to send a disable command to the switch in response to setting the port status to blocked; and
the blackhole command triggers the switch to disable the port the endpoint device is connected to.

13. The device of claim 8, wherein:
the access control engine is further configured to send a disable command to the switch in response to setting the port status to blocked; and
the blackhole command triggers the switch to disconnect electrical power to the port the endpoint device is connected to.

14. The device of claim 8, wherein the access control engine is further configured to send a spoofing alert in response to setting the port status to blocked.

15. An information security method, comprising:
receiving, at an access control engine implemented by a processor, device information for an endpoint device connected to a port of the switch, comprising:
  a MAC address for the endpoint device; and
  a device type for the endpoint device;
comparing, by the access control engine, the MAC address for the endpoint device to MAC addresses in a device information table, wherein the device table comprises:
  MAC addresses of previously authenticated endpoint devices; and
  device types linked with the MAC addresses of previously authenticated endpoint devices;
identifying, by the access control engine, a MAC address in the device information table that matches the MAC address for the endpoint device;
identifying, by the access control engine, a device type for the identified MAC address in the device information table;
comparing, by the access control engine, the device type for the endpoint device to the device type for the identified MAC address in the device information table;
determining, by the access control engine, that the device type for the endpoint device does not match the device type for the identified MAC address in the device information table; and
setting, by the access control engine, a port status for the port to blocked in response to determining that the device type for the endpoint device does not match the device type for the identified MAC address in the device information table.

16. The method of claim 15, further comprising:
sending, by the access control engine, a blackhole command to the switch in response to setting the port status to blocked; and
transforming, by the switch, the destination of traffic associated with the endpoint device to a null destination in response to receiving the blackhole command.

17. The method of claim 15, further comprising:
sending, by the access control engine, a blackhole command to the switch in response to setting the port status to blocked; and
discarding, by the switch, traffic associated with the endpoint device in response to receiving the blackhole command.

18. The method of claim 15, further comprising:
sending, by the access control engine, a disable command to the switch in response to setting the port status to blocked; and
disabling, by the switch, the port the endpoint device is connected to in response to receiving the disable command.

19. The method of claim 15, further comprising:
sending, by the access control engine, a disable command to the switch in response to setting the port status to blocked; and
disconnecting, by the switch, electrical power to the port the endpoint device is connected to in response to receiving the disable command.

20. The method of claim 15, wherein further comprising sending, by the access control engine, a spoofing alert in response to setting the port status to blocked.

* * * * *